United States Patent
Park et al.

(10) Patent No.: US 12,211,995 B2
(45) Date of Patent: Jan. 28, 2025

(54) NEGATIVE ELECTRODE ACTIVE MATERIAL AND LITHIUM SECONDARY BATTERY COMPRISING THE SAME

(71) Applicant: LG Energy Solution, Ltd., Seoul (KR)

(72) Inventors: Sung-Bin Park, Daejeon (KR); Bo-Na Kim, Daejeon (KR); Dae-Hong Kim, Daejeon (KR); In-Sun Yoo, Daejeon (KR); Wang-Mo Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 580 days.

(21) Appl. No.: 17/431,667

(22) PCT Filed: Mar. 6, 2020

(86) PCT No.: PCT/KR2020/003191
§ 371 (c)(1),
(2) Date: Aug. 17, 2021

(87) PCT Pub. No.: WO2020/180156
PCT Pub. Date: Sep. 10, 2020

(65) Prior Publication Data
US 2022/0115647 A1     Apr. 14, 2022

(30) Foreign Application Priority Data
Mar. 6, 2019     (KR) ........................ 10-2019-0025997

(51) Int. Cl.
*H01M 4/36*     (2006.01)
*C01F 7/74*     (2022.01)
(Continued)

(52) U.S. Cl.
CPC ............... *H01M 4/366* (2013.01); *C01F 7/74* (2013.01); *C01G 23/005* (2013.01);
(Continued)

(58) Field of Classification Search
CPC ... H01M 4/366; C01G 23/005; C01P 2004/50
See application file for complete search history.

(56) References Cited

U.S. PATENT DOCUMENTS

| 9,627,680 B2 * | 4/2017 | Yukinobu | ............... C01G 53/42 |
| 10,490,807 B2 * | 11/2019 | Zhu | ........................ H01M 4/625 |

(Continued)

FOREIGN PATENT DOCUMENTS

| CN | 102024949 A1 | 4/2011 |
| CN | 102376947 A | 3/2012 |

(Continued)

OTHER PUBLICATIONS

Translation of Written Opinion—ETWOS (No date) (Year: 0000).*
(Continued)

*Primary Examiner* — Amanda C. Walke
(74) *Attorney, Agent, or Firm* — Birch, Stewart, Kolasch & Birch, LLP

(57) ABSTRACT

A negative electrode active material for a secondary battery, including lithium titanium-based composite particles comprising: a lithium titanium oxide represented by $Li_xTi_yO_z$, wherein x, y and z satisfy $0.1 \leq x \leq 4$, $1 \leq y \leq 5$ and $2 \leq z \leq 12$; Zr doped into the lithium titanium oxide; and an aluminum and sulfur containing compound coated on a surface of the lithium titanium oxide. The lithium titanium-based composite particles include at least one of primary particles or secondary particles formed by agglomeration of the primary particles, and an average particle size of the primary particles of the lithium titanium-based composite particles is in a range of 550 nm to 1.1 μm.

13 Claims, 1 Drawing Sheet

(51) Int. Cl.
*C01G 23/00* (2006.01)
*H01M 4/485* (2010.01)
*H01M 4/62* (2006.01)
*H01M 10/0525* (2010.01)
*H01M 4/02* (2006.01)

(52) U.S. Cl.
CPC ............ *H01M 4/485* (2013.01); *H01M 4/62* (2013.01); *H01M 10/0525* (2013.01); *C01P 2004/50* (2013.01); *C01P 2004/61* (2013.01); *C01P 2004/62* (2013.01); *C01P 2006/40* (2013.01); *H01M 2004/021* (2013.01); *H01M 2004/027* (2013.01)

(56) References Cited

U.S. PATENT DOCUMENTS

| | | | |
|---|---|---|---|
| 10,516,186 B2 * | 12/2019 | Park | H01M 4/131 |
| 2011/0059366 A1 | 3/2011 | Eom | |
| 2014/0038058 A1 | 2/2014 | Holzapfel et al. | |
| 2014/0312269 A1 * | 10/2014 | Laumann | C01G 23/00 429/231.1 |
| 2014/0322609 A1 | 10/2014 | Choi et al. | |
| 2015/0004493 A1 | 1/2015 | Kim et al. | |
| 2015/0118574 A1 * | 4/2015 | Visbal | H01M 4/62 429/304 |
| 2015/0325843 A1 | 11/2015 | Yoon et al. | |
| 2016/0013479 A1 * | 1/2016 | Iwasaki | H01M 4/0402 429/305 |
| 2016/0079594 A1 | 3/2016 | Choi et al. | |
| 2016/0204433 A1 | 7/2016 | Takemoto et al. | |
| 2018/0013128 A1 | 1/2018 | Lim et al. | |
| 2018/0198155 A1 | 7/2018 | Park et al. | |
| 2018/0212233 A1 * | 7/2018 | Ito | H01M 10/0562 |
| 2018/0351171 A1 | 12/2018 | Jeon et al. | |
| 2020/0091511 A1 | 3/2020 | Park et al. | |
| 2021/0305562 A1 * | 9/2021 | Kamaya | H01M 4/366 |

FOREIGN PATENT DOCUMENTS

| | | | | |
|---|---|---|---|---|
| CN | 103548186 A | * | 1/2014 | ......... H01M 10/052 |
| CN | 103918110 A | * | 7/2014 | ......... H01M 10/052 |
| CN | 104205483 A | | 12/2014 | |
| CN | 106415899 A | | 2/2017 | |
| CN | 107210429 A | | 8/2017 | |
| EP | 3 232 497 A1 | | 10/2017 | |
| JP | 2014-511335 A | | 5/2014 | |
| JP | 2018-160432 A | | 10/2018 | |
| KR | 10-2013-0055080 A | | 5/2013 | |
| KR | 10-2014-0096136 A | | 8/2014 | |
| KR | 10-2014-0137720 A | | 12/2014 | |
| KR | 10-1569782 B1 | | 11/2015 | |
| KR | 10-2017-0063372 A | | 6/2017 | |
| KR | 10-2018-0011207 A | | 1/2018 | |
| KR | 10-1847769 B1 | | 4/2018 | |
| KR | 10-2018-0087225 A | | 8/2018 | |
| KR | 10-1908222 B1 | | 10/2018 | |
| KR | 20190035650 A | * | 4/2019 | |
| WO | WO 2016/196688 A1 | | 12/2016 | |
| WO | WO-2021001496 A1 | * | 1/2021 | ............ C01G 53/50 |

OTHER PUBLICATIONS

Senoh et al., Electrochemical characteristics of aluminum sulfide for use in lithium secondary batteries, Journal of Power Sources, 195, 8327-8330 (2010) (Year: 2010).*
Extended European Patent Office Search Report dated Apr. 28, 2022 for corresponding EP Application No. 20765642.2.
International Search Report for PCT/KR2020/003191 mailed on Jun. 18, 2020.

* cited by examiner

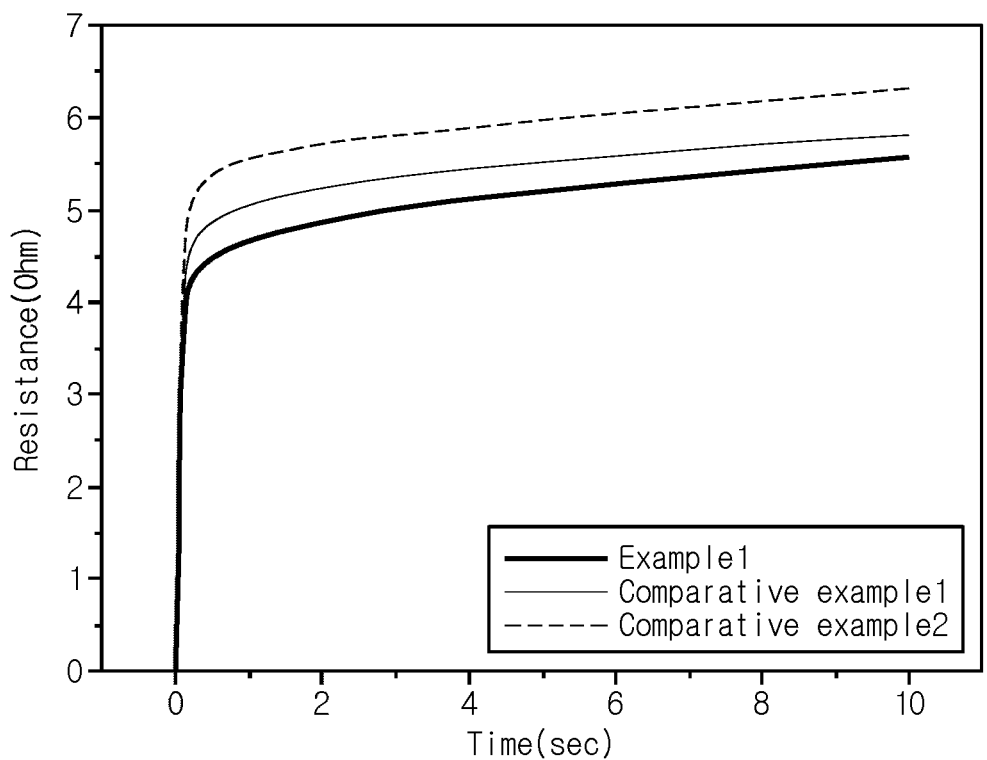

NEGATIVE ELECTRODE ACTIVE
MATERIAL AND LITHIUM SECONDARY
BATTERY COMPRISING THE SAME

TECHNICAL FIELD

The present disclosure relates to a negative electrode active material and a lithium secondary battery comprising the same, and more particularly, to a negative electrode active material that can be used in a negative electrode with reduced charge transfer resistance (CTR) at low temperature and a lithium secondary battery comprising the same with low resistance at room temperature and low temperature and improved output characteristics.

The present application claims priority to Korean Patent Application No. 10-2019-0025997 filed in the Republic of Korea on Mar. 6, 2019, the disclosure of which is incorporated herein by reference.

BACKGROUND ART

With the increasing costs of energy sources due to the exhaust of fossil energy and the growing interest in environmental pollution, the demand for eco-friendly alternative energy sources is an essential prerequisite for future life.

As the use of energy has been extended to mobile phones, camcorders, lap-top computers, and even electric vehicles, many efforts have been devoted to studying and developing electrochemical devices.

In this aspect, electrochemical devices are attracting more attention, and especially, development of rechargeable secondary batteries is the focus of attention, and more recently, in the development of batteries, new electrode and battery design for improving the capacity density and specific energy have been studied and developed.

Particularly, lithium secondary batteries are used as power sources for Electric Vehicles (EVs), Hybrid Electric Vehicles (HEVs) and micro Hybrid Electric Vehicles (u-HEVs) in recent years, and they are extending the range of application to supplementary power sources through grids.

The micro Hybrid Electric Vehicles partly use secondary batteries, and the development of 12V dual or 48V secondary batteries for micro Hybrid Electric Vehicles moves towards higher output performance.

Meanwhile, lithium titanium oxide provides efficiency that is nearly close to 100% in the first charge and discharge cycle, and does not form a thin film on the surface of the negative electrode by the electrolyte decomposition reaction due to its high driving voltage, and thus it is expected to use lithium titanium oxide as a high output negative electrode material.

Accordingly, it is essential to use lithium titanium oxide to achieve fast charge and discharge characteristics of 20 C or above, but the existing lithium titanium oxide cannot satisfy the corresponding output requirement.

Accordingly, there is still a need to develop lithium titanium oxide negative electrode materials for use in hybrid electric vehicle applications requiring high output characteristics.

DISCLOSURE

Technical Problem

Therefore, the present disclosure is directed to providing a negative electrode active material that can be used in a negative electrode with reduced charge transfer resistance at low temperature.

The present disclosure is further directed to providing a lithium secondary battery comprising the negative electrode active material.

Technical Solution

To solve the above-described problem, according to an aspect of the present disclosure, there is provided a negative electrode active material of the following embodiments.

According to a first embodiment, there is provided a negative electrode active material for a secondary battery, comprising:
 lithium titanium-based composite particles comprising:
  a lithium titanium oxide represented by $Li_xTi_yO_z$ wherein x, y and z satisfy $0.1 \leq x \leq 4$, $1 \leq y \leq 5$ and $2 \leq z \leq 12$;
  Zr doped into the lithium titanium oxide; and
  an aluminum and sulfur containing compound coated on a surface of the lithium titanium oxide,
 wherein the lithium titanium-based composite particles comprise at least one of primary particles or secondary particles formed by agglomeration of the primary particles, and
 an average particle size (D50) of the primary particles of the lithium titanium-based composite particles is in a range of 550 nm to 1.1 μm.

According to a second embodiment, in the first embodiment, the aluminum and sulfur containing compound may include $Al_2(SO_4)_3$ or $Al_2S_3$.

According to a third embodiment, in the first or second embodiment, an amount of the doped Zr in the lithium titanium oxide may be 500 ppm to 2,000 ppm based on the weight of the lithium titanium oxide.

According to a fourth embodiment, in any one of the first to third embodiments, the aluminum and sulfur containing compound may be present in an amount of 0.4 mM to 0.9 mM based on 1M lithium titanium oxide.

According to a fifth embodiment, in any one of the first to fourth embodiments, the lithium titanium oxide may be further doped with at least one of aluminum or sulfur.

According to a sixth embodiment, in any one of the first to fifth embodiments, the average particle size (D50) of the primary particles of the lithium titanium-based composite particles may be 600 nm to 1.0 μm.

To solve the above-described problem, according to an aspect of the present disclosure, there is provided a method for manufacturing a negative electrode active material of the following embodiments.

According to a seventh embodiment, there is provided a method for manufacturing a negative electrode active material for a secondary battery, comprising:
 (a) mixing a lithium precursor, a titanium precursor and a zirconium precursor to prepare a precursor mixture;
 (b) thermally treating the precursor mixture at a temperature ranging from 700° C. to 1,100° C. to obtain a lithium titanium oxide; and
 (c) mixing the lithium titanium oxide obtained after the thermal treatment with an aluminum and sulfur containing compound and thermally treating the mixture at a temperature ranging from 400° C. to 500° C. to obtain a lithium titanium-based composite particles,
 wherein the lithium titanium-based composite particles may include at least one of primary particles or secondary particles formed by agglomeration of the primary particles, and
 an average particle size (D50) of the primary particles of the lithium titanium-based composite particles is 550 nm to 1.1 μm.

According to an eighth embodiment, in the seventh embodiment, the lithium precursor may include at least one of $Li_2CO_3$, LiOH, LIF, $Li_2SO_4$, $LiNO_3$, or LiCl.

According to a ninth embodiment, in the seventh or eighth embodiment, the titanium precursor may include at least one of $TiO_2$, $TiCl_4$, $TiOCl_2$, $TiOSO_4$, or $TiO(OH)_2$.

According to a tenth embodiment, in any one of the seventh to ninth embodiments, the zirconium precursor may include at least one of $Zr(OH)_4$, or $ZrO_2$.

According to an eleventh embodiment, in any one of the eighth to tenth embodiments, preparing the precursor mixture comprises mixing the titanium precursor and the zirconium precursor with water, performing wet milling at 500 rpm to 2,000 rpm for 30 minutes to 3 hours, and adding the lithium precursor.

According to a twelfth embodiment, in any one of the eighth to eleventh embodiments, the aluminum and sulfur containing compound may include $Al_2(SO_4)_3$ or $Al_2S_3$.

According to a thirteenth embodiment, in any one of the eighth to twelfth embodiments, a temperature of the thermal treatment performed after mixing the lithium titanium oxide with the aluminum and sulfur containing compound may be 400° C. to 480° C., and the aluminum and sulfur containing compound may be present in an amount of 0.5 mM to 0.8 mM based on 1M lithium titanium oxide.

According to a fourteenth embodiment, in the thirteenth embodiment, the thermal treatment temperature may be 450° C., and the aluminum and sulfur containing compound may be present in an amount of 0.7 mM based on 1M lithium titanium oxide.

To solve the above-described problem, according to an aspect of the present disclosure, there is provided a lithium secondary battery of the following embodiment.

According to a fifteenth embodiment, there is provided a lithium secondary battery, comprising:
a positive electrode comprising a positive electrode active material, a negative electrode comprising a negative electrode active material, a separator interposed between the positive electrode and the negative electrode, and an electrolyte solution,
wherein the negative electrode active material is the negative electrode active material for a secondary battery defined in any one of the first to sixth embodiments.

Advantageous Effects

The negative electrode active material according to an embodiment of the present disclosure comprises a lithium titanium-based composite including Al sulfide coated on the surface of lithium titanium oxide, so that lithium ions do not occupy the 8a site during high rate intercalation and thus there is no kinetic effect, thereby minimizing the resistance increase rate with the increasing charge rate.

In addition, the negative electrode active material according to an embodiment of the present disclosure has an optimal average particle size of primary particles of the lithium titanium-based composite, and thus a secondary battery adopting the negative electrode active material may have the minimized charge transfer resistance and improved resistance at low temperature.

As a result, the negative electrode active material according to an embodiment of the present disclosure may be used in 12V or 48V secondary battery system applications. In addition, the negative electrode active material according to an embodiment of the present disclosure may be used in automobile battery applications requiring high output such as micro hybrid batteries.

BRIEF DESCRIPTION OF DRAWING

The accompanying drawing illustrates a preferred embodiment of the present disclosure, and together with the above-described description, serves to provide a further understanding of the technical aspects of the present disclosure, and accordingly, the present disclosure should not be interpreted as being limited to the drawing.

The FIGURE is a graph showing the resistance at SOC 50% with charge at low temperature (−20° C.) in example 1 and comparative examples 1 and 2.

DETAILED DESCRIPTION

Hereinafter, the present disclosure will be described in detail. Prior to the description, the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description disclosed herein and illustration shown in the drawing are just a most preferable example, but not intended to fully describe the technical aspects of the present disclosure, so it should be understood that other equivalents and modifications could have been made thereto at the time of filing an application.

Currently, in the manufacture of lithium secondary batteries, to reduce Charge Transfer Resistance (Rct) is one of the important issues. When the charge transfer resistance is high, usually intercalcation/deintercalation of lithium ions at the negative electrode is not easy.

Charge transfer resistance greatly affects the resistance at low temperature (for example, −20° C.) of secondary batteries comprising lithium titanium oxide as the negative electrode active material. As charge transfer resistance results from conduction paths, when lithium titanium oxide is designed to have a small particle size to improve the output, formation of conduction paths is difficult, resulting in increased charge transfer resistance. On the other hand, to minimize the charge transfer resistance, it is necessary to increase the particle size of lithium titanium oxide, but a very large particle size makes diffusion of lithium ions difficult.

The present disclosure is directed to providing a negative electrode active material comprising a lithium titanium-based composite including a predetermined amount of Al sulfide coated on the surface of lithium titanium oxide to improve the resistance at low temperature of a secondary battery comprising lithium titanium oxide as the negative electrode active material, and having an optimal average particle size of primary particles of the lithium titanium-based composite, so that lithium ions do not occupy the 8a site during high rate intercalation and thus there is no kinetic effect, thereby minimizing the resistance increase rate with the increasing charge rate, and a secondary battery comprising the same.

According to an aspect of the present disclosure, there is provided a negative electrode active material for a secondary battery comprising:
a lithium titanium-based composite comprising:

lithium titanium oxide (LTO) represented by the following chemical formula 1;
Zr doped into the lithium titanium oxide; and
Al sulfide coated on the surface of the lithium titanium oxide,
wherein the lithium titanium-based composite includes primary particles alone or in combination with secondary particles formed by agglomeration of the primary particles, and the average particle size of the primary particles of the lithium titanium-based composite is 550 nm to 1.1 μm:

$$Li_xTi_yO_z$$ [Chemical formula 1]

where x, y and z satisfy 0.1≤x≤4, 1≤y≤5 and 2≤z≤12.

In general, a negative electrode for a high output secondary battery as an alternative to a carbon-based negative electrode is a negative electrode using lithium titanium oxide, and the lithium titanium oxide performs two phase reactions between a spinel structure and a rock salt structure by lithium intercalation and deintercalcation during charging and discharging. In this instance, due to the two phase reactions, even when resistance is measured at the same SOC, the resistance value may vary depending on a direction in which SOC is set (charging or discharging), and the resistance value may also vary depending on the charge rate.

The ununiform resistance value comes from the structural characteristics of lithium titanium oxide, i.e., intercalation and deintercalation of lithium ions through a phase change between a spinel structure and a rock salt structure, and this problem may make an estimation algorithm very complicated since estimation in a battery management system (BMS) is difficult when a lithium secondary battery using lithium titanium oxide as the negative electrode active material is used in a battery pack.

However, as in the present disclosure, with the negative electrode active material comprising a lithium titanium-based composite including lithium titanium oxide; Zr doped into the lithium titanium oxide; and Al sulfide coated on the surface of the lithium titanium oxide, the measured resistance value is uniformly low irrespective of the direction in which SOC is set and the charge rate, thereby overcoming the unique resistance difference resulting from the structural characteristics of lithium titanium oxide.

In the case of the common lithium titanium oxide, most of lithium ions intercalated during charging and discharging are located at the 8a site and their position is not reversibly changed, resulting in increased resistance.

The negative electrode active material comprising the lithium titanium-based composite of the present disclosure includes Al sulfide coated on the surface of the lithium titanium oxide, to suppress reduction in crystallite size, thereby forming an inter-diffusion layer on the surface, which increases energy for Li entering the 8a site, and thus lithium ions do not occupy the 8a tetrahedral sites of the lithium titanium oxide during high rate intercalation. As a result, the position of lithium ions intercalated during charging and discharging may be reversibly changed, and it is possible to overcome the unique resistance difference resulting from the structural characteristics of the lithium titanium oxide. Due to the absence of the kinetic effect, the negative electrode active material comprising the lithium titanium-based composite of the present disclosure may be easily used in 12V or 48V secondary battery system applications.

The lithium secondary battery according to the present disclosure that overcame the unique resistance difference resulting from the structural characteristics may have a minimum change in resistance, for example, below 5% or 3% in the range between SOC 5 and 100 during charging and discharging, irrespective of a direction in which resistance is measured.

The absence of the kinetic effect makes it easy to use in 12V or 48V secondary battery system applications. In this instance, the kinetic effect is a difference in resistance between the pulse resistance measured after Li intercalation (charge) into LTO at low rate and the pulse resistance after intercalation (charge) at high rate.

In detail, in this instance, when a start SOC is SOC(start) and a target SOC is SOC(target), the kinetic effect may be defined as a percentage difference between 10 C charge resistance measured after charging at 1 C from SOC(start) to SOC(target-20) (SOC lower by 20% than target SOC (%)) and then charging at 1 C to SOC(target), and 10 C charge resistance measured after charging at 1 C from SOC(start) to SOC(target-20) and then charging at 10 C to SOC(target).

The lithium titanium oxide may be, for example, $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, $LiTi_2O_4$ and $Li_2TiO_3$, and to be more specific, $Li_4Ti_5O_{12}$, $Li_{1.33}Ti_{1.67}O_4$ or $LiTi_2O_4$ with a small change in crystal structure during charging and discharging and a good spinel structure. However, the lithium titanium oxide is not limited thereto.

In the negative electrode active material for a secondary battery according to the present disclosure, the lithium titanium-based composite may be in the form of primary particles alone, or in combination with secondary particles formed by agglomeration of the primary particles. Here, the primary particle refers to a minimum unit of particle that makes up the lithium titanium-based composite, and the secondary particle refer to a particle in agglomerated form of primary particles, for example, 3 or more, or 3 to 5, or 3 to 4 primary particles.

To obtain the lithium titanium oxide exhibiting high output characteristics, it is necessary to reduce the particle size and the grain size of the primary particles of the lithium titanium-based composite.

When the particle size decreases with spaces being formed between the primary particles of the lithium titanium-based composite, the distance of Li ions in the particles decreases and the reactive area of Li ions increases, resulting in significantly increased output characteristics.

The lithium titanium-based composite may have the grain size of 100 nm to 200 nm, specifically 110 nm to 180 nm, and more specifically 140 nm to 160 nm.

When the grain size is smaller than 100 nm, a large number of grain boundaries is unfavorable for intercalation of lithium ions and the charge characteristics of the battery may degrade, and when the grain size is larger than 200 nm, diffusion of lithium ions in the grain is difficult, resulting in the increased resistance and reduced output.

The grain size of the lithium titanium-based composite particles may be measured using the Rietveld refinement program Topaz. The grain size measurement method using the Topaz program may include methods commonly used in the technical field pertaining to the present disclosure.

In the lithium titanium-based composite of the present disclosure, the lithium titanium oxide is doped with Zr. The doped Zr serves to reduce the resistance and thereby improve the rate characteristics, and specifically, serves to increase the bulk lattice constant. And, the doped Zr prevent an increase in kinetic effect value by coating the lattice constant on the surface with Al in order to control the Kinetic effect An amount of the doped Zr may be 500 to 2,000 ppm, or 700 to 1,500 ppm, or 900 to 1,100 ppm based on the weight of the lithium titanium oxide. When the amount of the doped Zr satisfies the above range, the lattice parameter of bulk structure may increase and a change in resistance may remarkably decrease, and through this, mobility of Li ions may increase, thereby providing the lithium secondary battery having improved output characteristics.

The Al sulfide is coated on the surface of the lithium titanium oxide to suppress reduction in the lattice parameter on the surface and form an inter-diffusion layer, which prevents Li occupancy in the 8a site during fast charging (Li intercalation).

The Al sulfide may include $Al_2(SO_4)_3$, $Al_2S_3$ or a combination thereof.

An amount of Al sulfide coated on the surface of the lithium titanium oxide may be 0.4 mM to 0.9 mM, and to be specific, 0.5 mM to 0.8 mM, or 0.5 mM to 0.7 mM based on 1M lithium titanium oxide.

When the amount of Al sulfide satisfies the above range, it is possible to prevent the problem facing when the amount of Al sulfide is low, namely, the inter-diffusion layer is not sufficiently formed, failing to reduce the kinetic effect, and the problem facing when the amount of Al sulfide is very high, namely, the inter-diffusion layer increases in thickness and the side reaction layer (coating layer) on the surface increases in thickness, resulting in increased resistance and reduced capacity.

According to an embodiment of the present disclosure, the lithium titanium oxide may be further doped with Al, S (sulfur) or both. When the lithium titanium oxide is further doped with Al, S (sulfur) or both, an increase in lattice parameter on the surface is suppressed and the lattice parameter for Li intercalation in the 8a site on the surface decreases, and Li cannot occupy the 8a site during high rate charging.

In this instance, an amount of at least one of Al and S (sulfur) used for further doping may be 500 to 1,500 ppm, or 700 to 1,300 ppm, or 900 to 1,100 ppm based on the total weight of the lithium titanium-based composite.

In the present disclosure, the primary particles of the lithium titanium-based composite may have the average particle size (on a volume basis, D50) of 550 nm to 1.1 μm, and to be specific, 600 nm to 1.0 μm, or 650 nm to 750 nm. When the average particle size of the primary particles of the lithium titanium-based composite is smaller than 550 nm, it is difficult to form conduction paths in the lithium titanium-based composite, the charge transfer resistance increases, and intercalation/deintercalation of lithium ions at the negative electrode comprising the same is not easy, resulting in a decrease in output characteristics. When the average particle size of the primary particles of the lithium titanium-based composite is larger than 1.1 μm, diffusion of lithium ions at the negative electrode comprising the same is difficult, resulting in reduced capacity and increased resistance.

In the present disclosure, the average particle size D50 of the primary particles of the lithium titanium-based composite may be defined as a particle size corresponding to 50% of the total volume accumulated from small particles. In the present disclosure, the average particle size D50 may be measured, for example, by electron microscopy observation using scanning electron microscopy (SEM) or field emission scanning electron microscopy (FE-SEM), or a laser diffraction method. More specifically, when a laser diffraction method is used to measure the average particle size D50, the primary particles of the lithium titanium-based composite may be dispersed in a dispersion medium and introduced into a commercially available laser diffraction particle size measurement instrument (for example, Microtrac MT 3000), and after illuminated with an ultrasound of about 28 kHz at the output of 60 W, the average particle size D50 at 50% of the particle size distribution in the measurement instrument may be calculated.

When the average particle size of the primary particles of the lithium titanium-based composite satisfies the above range, the pellet density may increase and electrode processing may be improved. When the average particle size is too small, a large amount of conductive materials is needed, which makes it impossible to form an electrode, and when the average particle size is too large, the output may be reduced.

Each of the primary particles and the secondary particles may independently have a spherical or quasi-spherical shape, and here, the quasi-spherical shape has a 3-dimensional volume including an oval shape, and includes particles of all shapes including amorphous particles having an indeterminate form.

Additionally, in an embodiment of the present disclosure, the negative electrode active material layer is a pore structure having a plurality of pores, and for example, the pore structure may come from at least one of characteristics of many shapes of the lithium titanium-based composite particles as described below.

The secondary particles of the lithium titanium-based composite have a porous structure in which pores are formed on the surface of the secondary particles and in the body by the pores formed between the agglomerated primary particles. Additionally, the lithium titanium-based composite primary particles may have a porous structure in which a plurality of primary pores is formed on the surface and in the particle body. The pores are connected to one or more adjacent pores, thus serving as channels through which the electrolyte solution moves. Accordingly, the pores formed in the particles and connected with one another serve as channels through which the electrolyte solution moves.

The lithium titanium oxide included in the lithium titanium-based composite has spinel structures and provides 3-dimensional Li diffusion pathways, and thus is advantageous for fast charge and high output characteristics. Additionally, the lithium titanium oxide maintains the original crystal structure during charging and discharging and thus has high structural stability.

Additionally, the lithium titanium oxide may have capacity of 160 to 172 mAh/g, and preferably 165 to 170 mAh/g by lithiation.

Additionally, the lithium titanium oxide may produce lithium carbonate as a by-product in an amount of 0.5 weight % or less, or 0.2 weight % or less based on 100 weight % of the lithium titanium oxide.

According to an aspect of the present disclosure, there is provided a method for manufacturing a negative electrode active material for a secondary battery comprising:
(a) mixing a lithium precursor, a titanium precursor, and a zirconium precursor to prepare a precursor mixture;
(b) thermally treating the precursor mixture at 700 to 1,100° C. to obtain lithium titanium oxide; and
(c) mixing the lithium titanium oxide obtained after the thermal treatment with Al sulfide and thermally treating the mixture at 400 to 500° C. to obtain a lithium titanium-based composite,
wherein the lithium titanium-based composite includes primary particles alone or in combination with secondary particles formed by agglomeration of the primary particles, and
the average particle size of the primary particles of the lithium titanium-based composite is 550 nm to 1.1 μm.

In detail, an example of the method for manufacturing a negative electrode active material for a secondary battery according to the present disclosure may be as follows.

First, (a) the lithium precursor, the titanium precursor, and the zirconium precursor are mixed to prepare the precursor mixture.

The mixing the precursor mixture in the step (a) is a process for uniformly mixing the lithium precursor, the titanium precursor and the zirconium precursor, and the mixing method is not limited to a particular type and may include any mixing method for uniformly mixing the precursor mixture in a dry state, and may include a wet mixing method and a dry mixing method.

The mixing may use a wet mixing method, and when the wet mixing method using a spray drying process is taken as an example, the lithium precursor, the titanium precursor and the zirconium precursor may be added to a solvent and stirred to uniformly mix them to prepare a precursor composition. The precursor composition may be injected into a chamber with a spray dryer, followed by solvent evaporation, to produce mixed precursor powder.

In detail, the precursor composition may be prepared by dissolving the lithium precursor and the titanium precursor in a solvent to prepare a composition and adding the zirconium precursor while stirring the composition, and the used volatile solvent may include water, for example, deionized water or distilled water, alcohol having a small number of carbon atoms, for example, methanol, ethanol or propanol, or acetone, and any solvent that can be easily evaporated by heat applied during the spray drying may be used.

According to an embodiment of the present disclosure, in the step of preparing the precursor mixture, the precursors may have the controlled average particle size to adjust the average particle size of the lithium titanium oxide obtained later through sintering of the precursor mixture to a desired level.

In detail, in the step of preparing the precursor mixture, the milling time and the rpm condition may be adjusted to control the average particle size of the precursors. Accordingly, the step of preparing the precursor mixture may include mixing the titanium precursor and the zirconium precursor with water, performing wet milling at 500 to 2,000 rpm for 30 minutes to 3 hours, and mixing the wet milled result with the lithium precursor. Additionally, the wet milling may be performed at 800 to 1,500 rpm for 1 to 2 hours, or at 500 to 1,000 rpm for 30 minutes to 80 minutes.

The prepared precursor composition may be injected into the chamber with the spray dryer as described above, and the precursor composition may be sprayed by the spray dryer, and at the same time, may be dried.

The spray dryer may include, for example, an ultrasonic spray dryer, an air nozzle spray dryer, an ultrasonic nozzle spray dryer, a filter expansion aerosol generator, an electrostatic spray dryer or a combination thereof. The spray drying may be preferably performed at the internal temperature of the chamber of 20 to 300° C., and when the temperature is higher than 300° C., there is a likelihood that particle agglomeration or particle growth of the mixed precursor powder may occur, thus requiring appropriate temperature control.

The mixing may use a dry mixing method, and the dry mixing method may include mixing the lithium precursor, the titanium precursor and the zirconium precursor through a mechanical method, and for example, the mixing method may use a ball mill, a high speed rotary mill, a stirred mill, a jet mill or a combination thereof.

The lithium precursor is not limited to a particular type, and may include any source material that can supply lithium such as a lithium salt including a lithium ion and a salt, for example, $Li_2CO_3$, LiOH, LiF, $Li_2SO_4$, $LiNO_3$, LiCl or a combination thereof.

Additionally, the titanium precursor is not limited to a particular type and may include any type of source material that can supply titanium, such as an oxide of titanium, and the titanium precursor may be in the form of a hydrate and a dry powder. In this instance, when the titanium precursor is a hydrate, it may be desirable to mix the titanium precursor with the lithium precursor using a wet mixing method, and when the titanium precursor is a dry powder, it may be desirable to use a dry mixing method. The titanium precursor may include, for example, $TiO_2$, $TiCl_4$, $TiOCl_2$, $TiOSO_4$, $TiO(OH)_2$, or a combination thereof.

The zirconium precursor may include $Zr(OH)_4$, $ZrO_2$, or a combination thereof.

Subsequently, (b) the precursor mixture is thermally treated at 700 to 1,100° C. to obtain lithium titanium oxide.

The step (b) may include thermally treating the precursor mixture, and may be a sintering process for thermally treating the mixed, dried precursor powder by any method to produce a titanium-based composite.

It may be necessary to appropriately control the thermal treatment temperature or time, and in the battery performance and safety aspects, it may be necessary to prevent the lithium precursor, the titanium precursor or the zirconium precursor from staying unreacted, and to avoid by-products such as lithium salts produced by side reactions, it may be necessary to control the sintering condition.

The thermal treatment is performed at the temperature of 700 to 1,100° C., or about 750 to 1050° C., or 790 to 1000° C.

When the thermal treatment temperature is lower than 700° C. and enough heat is not supplied, the unreacted lithium precursor or the lithium salt of the lithium compound caused by side reactions may remain in the titanium-based composite, and when there are a large amount of remaining impurities, side reactions or gas generation may occur and affect the storage performance or output characteristics of the battery, and when the thermal treatment temperature is higher than 1,100° C., lithium titanium oxide degradation or particle growth may occur due to excess energy supply and affect the output characteristics of the battery. Accordingly, it may be necessary to appropriately control the thermal treatment temperature.

It may be also necessary to control the thermal treatment time, and in the present disclosure, the thermal treatment may be preferably performed for about 2 to 12 hours, or 5 to 10 hours. When the thermal treatment time is satisfied, it is possible to produce lithium titanium oxide having an optimal grain size and structural stability and a minimum amount of lithium by-products, and avoid unnecessary energy waste or process cost consumption.

Subsequently, (c) the lithium titanium oxide obtained after the thermal treatment is mixed with the Al sulfide and the mixture is thermally treated at 400 to 500° C. to obtain the lithium titanium-based composite.

The mixing of the lithium titanium oxide obtained after the thermal treatment with the Al sulfide may use, without limitation, any method commonly used to form a coating layer, and as described above, wet mixing or dry mixing may be used.

For example, Al sulfide may be mixed with a dispersion medium, and the mixture may be added to the lithium titanium oxide obtained after the thermal treatment and stirred and mixed to prepare a composition. Subsequently, the prepared composition may be dried, and put into, for example, a chamber with a spray dryer, followed by solvent evaporation, to prepare a mixed precursor powder. In this instance, the spray dryer is as described above.

Subsequently, the drying result may be thermally treated at 400 to 500° C., or 400 to 480° C., or 420 to 460° C. When the thermal treatment temperature is outside of the above condition, coating is not achieved, or doping is performed without forming an inter-diffusion layer, thereby failing to eliminate the kinetic effect or resulting in reduced capacity.

Additionally, as described above, the Al sulfide coated on the surface of the lithium titanium oxide may be present in an amount of 0.4 mM to 0.9 mM based on 1M lithium titanium oxide, and to be specific, 0.5 mM to 0.8 mM, or 0.5 mM to 0.7 mM.

In an embodiment of the present disclosure, a loading amount of the negative electrode active material on the negative electrode may be 0.2 mAh/cm$^2$ to 2 mAh/cm$^2$.

According to a particular embodiment of the present disclosure, the negative electrode active material layer may further include a binder resin and a conductive material. Here, the negative electrode active material layer may include the negative electrode active material: the conductive material:the binder resin at a weight ratio of 80 to 90:7 to 13:3 to 9.

Additionally, in addition to the lithium titanium oxide, the negative electrode active material layer may further include, as the negative electrode active material, particles of at least one active material selected from the group consisting of carbonaceous materials such as natural graphite, artificial graphite; metals (Me) including Si, Sn, Li, Zn, Mg, Cd, Ce, Ni or Fe; alloys of the metals (Me); oxides (MeOx) of the metals (Me); and composites of the metals (Me) and carbon, commonly used as negative electrode active materials.

Non-limiting examples of the binder resin may include at least one selected from polyvinylidene fluoride-co-hexafluoropropylene, polytetrafluoroethylene (PTFE), polyvinylidene fluoride (PVDF), carboxy methylcellulose (CMC), polyvinyl alcohol (PVA), polyvinyl butyral (PVB), poly-N-vinylpyrrolidone (PVP), styrene butadiene rubber (SBR), polyamide-imide and polyimide, but is not limited thereto.

The conductive material is not limited to a particular type and may include any electron conducting material that does not cause a chemical change, for example, natural graphite, artificial graphite, carbon black, acetylene black, ketjen black, Super-P black, a carbon fiber, a metal powder or a metal fiber of copper, nickel, aluminum, silver.

In a particular embodiment of the present disclosure, the negative electrode may be manufactured by the following method. First, a negative electrode active material, a binder resin and a conductive material are dispersed in an appropriate solvent such as an organic solvent, for example, ethanol (EtOH), acetone, isopropyl alcohol, N-methylpyrrolidone (NMP) and propyleneglycol (PG), or water to prepare a negative electrode slurry, the negative electrode slurry is pressed into an electrode, or the slurry is coated on a metal foil into an electrode, or the composition for the negative electrode is pressed using rollers into a sheet and attached to a metal foil into an electrode, and the result formed into an electrode is dried at the temperature of 100° C. to 350° C. to form the negative electrode. Describing an example of forming the negative electrode in more detail, the negative electrode slurry may be formed by pressing using a roll press forming machine. The roll press forming machine is designed to improve the electrode density and control the electrode thickness through pressing, and includes top and bottom rolls, a controller to control the roll thickness and the heating temperature, and a winding unit to wind and unwind the electrode. The electrode wound in a roll form is pressed while passing through the roll press, and wound again in a roll form to complete the electrode. In this instance, the applied pressure by the press is preferably 5 to 20 ton/cm$^2$, and the temperature of the roll is preferably 0 to 150° C. After the slurry undergoes the roll pressing process, the slurry undergoes drying. The drying process is performed at the temperature of 100° C. to 350° C., and preferably 150° C. to 300° C. In this instance, when the drying temperature is lower than 100° C., solvent evaporation is difficult, and when drying is performed at high temperature above 350° C., oxidization of the conductive material may occur. Accordingly, preferably, the drying temperature is equal to or higher than 100° C., and does not exceed 350° C. Additionally, the drying process is preferably performed at the above-described temperature for about 10 minutes to 6 hours. The drying process may hold powder particles together while drying (solvent evaporation) the formed composition for the negative electrode, thereby improving the strength of the negative electrode.

The lithium secondary battery of the present disclosure includes the above-described negative electrode and a positive electrode, a separator interposed between the positive electrode and the negative electrode, and an electrolyte solution.

The positive electrode may be manufactured by binding a positive electrode active material to a positive electrode current collector by a common method known in the technical field pertaining to the present disclosure. Non-limiting examples of the positive electrode active material may include positive electrode active materials commonly used in positive electrodes of electrochemical devices, and preferably, lithium manganese oxide, lithium cobalt oxide, lithium nickel oxide, lithium iron oxide or their lithium composite oxide. Non-limiting examples of the positive electrode current collector may include a foil made of aluminum, nickel or a combination thereof.

The separator may include a porous substrate having a plurality of pores, alone or in combination with a porous coating layer including inorganic particles and a binder polymer, coated on at least one surface of the porous substrate.

The porous substrate may be a porous polymer substrate, and to be specific, may be a porous polymer film substrate or a porous polymer nonwoven substrate.

The porous polymer film substrate may be a porous polymer film made of polyolefin such as polyethylene and polypropylene, and the polyolefin porous polymer film substrate exhibits a shutdown function, for example, at the temperature of 80 to 130° C.

Additionally, the porous polymer film substrate may be formed in the shape of a film using various types of polymers such as polyolefin as well as polyester. Additionally, the porous polymer film substrate may be formed by stacking two or more film layers, and each film layer may be formed from polymer such as polyolefin and polyester as described above, used singly or in combination.

Additionally, in addition to the above-described polyolefins, the porous polymer film substrate and the porous nonwoven substrate may be formed from polyester, polyethyleneterephthalate, polybutyleneterephthalate, polyethylene naphthalate, polyacetal, polyamide, polycarbonate, polyimide, polyetheretherketone, polyethersulfone, polyphenyleneoxide and polyphenylenesulfide, used singly or in combination. The thickness of the porous substrate is not particularly limited, but is preferably 1 to 100 µm, and more preferably 5 to 50 µm, and the pore size and porosity of the porous substrate are not particularly limited, but the pore size is preferably 0.01 to 50 µm and the porosity is preferably 10 to 95%.

In the separator according to an aspect of the present disclosure, the binder polymer used to form the porous coating layer may include polymers commonly used to form the porous coating layer in the technical field pertaining to the present disclosure. Particularly, polymer having the glass transition temperature $T_g$ of −200 to 200° C. may be used to improve the mechanical properties of the finally formed porous coating layer such as flexibility and elasticity. The binder polymer faithfully serves as a binder to connect and stably immobilize the inorganic particles, contributing to the prevention of mechanical property degradation in the separator having the porous coating layer.

Additionally, the binder polymer does not need to be capable of transporting ions, but the use of polymer capable of transporting ions may further improve the performance of electrochemical devices. Accordingly, the binder polymer may include those having as high a dielectric constant as possible. The dissolution rate of salt in the electrolyte solution relies on the dielectric constant of the electrolyte solution solvent, and as the dielectric constant of the binder polymer increases, the dissociation rate of salt in the electrolyte may increase. The dielectric constant of the binder polymer may range between 1.0 and 100 (measured in frequency=1 kHz), and to be specific, 10 or above.

In addition to the above-described function, the binder polymer may show a high degree of swelling in the electrolyte solution by gelation when impregnated with the liquid electrolyte solution. Accordingly, the solubility parameter of the binder polymer, i.e, the Hildebrand solubility parameter ranges between 15 and 45 $MPa^{1/2}$ or between 15 and 25 $MPa^{1/2}$ or between 30 and 45 $MPa^{1/2}$. Accordingly, hydrophilic polymers having polar groups, rather than hydrophobic polymers such as polyolefins, may be used. When the solubility parameter is lower than 15 $MPa^{1/2}$ and higher than 45 $MPa^{1/2}$, the binder polymer may not swell in general liquid electrolyte solutions for batteries.

Non-limiting examples of the binder polymer may include polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methylcellulose, but is not limited thereto.

For example, a weight ratio of the inorganic particles and the binder polymer preferably ranges between 50:50 and 99:1, and more preferably between 70:30 and 95:5. When the ratio of the inorganic particles to the binder polymer satisfies the above range, it is possible to prevent reduction in the pore size and the porosity of the formed coating layer caused by the high amount of the binder polymer, and reduction in the peel resistance of the formed coating layer caused by the low amount of the binder polymer.

In the porous coating layer, the inorganic particles are packed in contact such that the inorganic particles are held together by the binder polymer, thus forming interstitial volumes therebetween, and the interstitial volumes are empty spaces that are to be pores.

That is, the binder polymer may bind the inorganic particles to hold them together, and for example, the binder polymer adheres and immobilizes the inorganic particles. Additionally, interstitial volumes between the inorganic particles are empty spaces that are to be the pores of the porous coating layer, and they are spaces defined by the inorganic particles substantially in surface contact in the closely packed or densely packed structure by the inorganic particles.

The inorganic particles are selected from the group consisting of inorganic particles having the dielectric constant of about 5 or more, inorganic particles capable of transporting lithium ions and a combination thereof.

According to an embodiment of the present disclosure, the electrolyte solution includes a salt having a structure represented by, for example, $A^+B^-$. Here, $A^+$ includes an alkali metal cation such as $Li^+$, $Na^+$, $K^+$ or a combination thereof, and preferably $Li^+$ ion. $B^-$ includes an anion such as $F^-$, $Cl^-$, $Br^-$, $I^-$, $NO_3^-$, $BF_4^-$, $PF_6^-$, $N(CN)_2^-$, $SCN^-$, $ClO_4^-$, $AsF_6^-$, $CF_3SO_3^-$, $(CF_3SO_2)_2^-$, $C(CF_2SO_2)_3^-$, $(CF_3)_3PF_3^-$, $(CF_3)_4PF_2^-$, $(CF_3)_5PF^-$, $(CF_3)_6P^-$, $(CF_3CF_2SO_2^-)_2N$, $(CF_3SO_2)_2N^-$, $CF_3SO_3^-$, $CF_3CF_2(CF_3)_2CO^-$, $(CF_3SO_2)_2CH^-$, $(CF_3SO_2)_3C^-$, $CF_3(CF_2)_7SO_3^-$, $CF_3CO_2^-$, $CH_3CO_2^-$ or a combination thereof. Preferably, the salt of the $A^+B^-$ structure is a lithium salt.

The salt of the $A^+B^-$ structure is dissolved and dissociated in an organic solvent. Non-limiting examples of the organic solvent may include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a combination thereof.

The pouring of the electrolyte solution may be performed in any suitable step of the battery manufacturing process according to the manufacturing process and the required properties of a final product. That is, the pouring of the electrolyte solution may be applied before battery assembly or in the final step of battery assembly.

According to an aspect of the present disclosure, there are provided a battery module including the lithium secondary battery as a unit battery and a battery pack including the battery module.

The lithium secondary battery of the present disclosure uses lithium titanium oxide as the negative electrode active material to achieve the improved output characteristics without actually causing a reduction in high temperature characteristics and battery capacity as described above, and uses lithium manganese composite oxide with low price and high stability at room temperature as the positive electrode active material, and when the lithium secondary battery is used in place of or in addition to an automobile lead-acid battery, it is possible to provide the battery pack with improved efficiency.

The battery pack may include lithium secondary batteries connected in series, or may include lithium secondary battery modules connected in series, each lithium secondary battery module including lithium secondary batteries connected in parallel.

The battery pack may be used as a power source of devices requiring high temperature stability, long cycle characteristics and high rate characteristics. For example, the device may include, but is not limited to, power tools; vehicles including Electric Vehicles (EVs), micro Hybrid Electric Vehicles (u-HEVs), Hybrid Electric Vehicles (HEVs) and Plug-in Hybrid Electric Vehicles (PHEVs); electric two wheelers including E-bike and E-scooters; electric golf carts; and energy storage systems, which are powered on and work by power from an electric motor.

Hereinafter, the present disclosure will be described in detail by way of examples. However, the examples of the present disclosure may be modified in many other forms, and the scope of the present disclosure should not be construed as being limited to the following examples. The examples of the present disclosure are provided to fully explain the present disclosure to those having ordinary knowledge in the art to which the present disclosure pertains.

Example 1

20 parts by weight of $TiO_2$ as a titanium precursor is mixed with 50 parts by weight of water, $Zr(OH)_4$ as a zirconium precursor is added at the concentration of 1,000 ppm based on lithium titanium oxide, and the result is put into a ball mill (Laval lab, Planetary ball mill pulverisette 5) in which wet milling is performed at 1,000 rpm for 60 minutes with an addition of 200 parts by weight of 0.7 mm zirconia milling agent. Subsequently, 7.4 parts by weight of $LiCO_3$ as a lithium precursor is added and stirred to prepare a precursor composition.

The prepared precursor composition is spray dried to obtain a secondary particle precursor, and the secondary particle precursor is thermally treated in a furnace at the temperature of 790° C. for 10 hours to obtain lithium titanium oxide ($Li_4Ti_5O_2$). 0.06 parts by weight of $Al_2(SO_4)_3$ (corresponding to 0.7 mM based on 1M lithium titanium oxide ($Li_4Ti_5O_2$)) is added to 50 parts by weight of water, and 20 parts by weight of the previously obtained lithium titanium oxide ($Li_4Ti_5O_2$) is added and stirred to prepare a composition. Subsequently, spray drying is performed to obtain a powder, and the powder is thermally treated in the furnace at the temperature of 450° C. for 5 hours to prepare a lithium titanium-based composite. In this instance, the obtained lithium titanium-based composite is primary particles having the average particle size D50 of 700 nm. The prepared lithium titanium-based composite includes Al sulfide coated on the surface of the lithium titanium oxide, and the Al sulfide is present in an amount of 0.7 mM based on 1M lithium titanium oxide. An amount of the doped Zr is 1,000 ppm based on the weight of the lithium titanium oxide.

92 weight % of the synthesized lithium titanium-based composite, 4 weight % of carbon black as a conductive material and 4 weight % of polyvinylidene fluoride (PVdF) as a binder are added to N-methyl-2-pyrrolidone (NMP) as a solvent to prepare a negative electrode mixture slurry. The prepared negative electrode mixture slurry is coated on one surface of an aluminum (Al) thin film having the thickness of about 20 μm as a negative electrode current collector, followed by drying and roll pressing, to manufacture a negative electrode having an active material layer with the porosity of approximately 33%.

<Manufacture of Positive Electrode>

96 weight % of a mixture of $LiMn_2O_4$ and $Li(Ni_{0.33}Co_{0.33}Mn_{0.33})O_2$ as a positive electrode active material, 2 weight % of carbon black as a conductive material and 2 weight % of polyvinylidene fluoride (PVdF) as a binder are added to N-methyl-2-pyrrolidone (NMP) as a solvent to prepare a positive electrode mixture slurry. The positive electrode mixture slurry is coated on one surface of an aluminum (Al) thin film having the thickness of about 20 μm as a positive electrode current collector, followed by drying and roll pressing, to manufacture a positive electrode.

<Manufacture of Lithium Secondary Battery>

A lithium secondary battery is manufactured using the above-described positive and negative electrodes by a common method, together with a separator of polypropylene/polyethylene/polypropylene (PP/PE/PP) triple layer structure, followed by injection of an electrolyte containing 1M $LiPF_6$ dissolved in a mixed solvent of ethylene carbonate (EC) and diethyl carbonate (DEC) at a volume ratio of 30:70.

<Manufacture of Half Cell>

A half cell is manufactured as follows.

0.4 g of a binder solution containing 5 wt % of polyvinylidene fluoride (PVdF) dissolved in N-methylpyrrolidone (NMP) is added to 0.98 g of the prepared lithium titanium-based composite, and mechanically stirred to prepare a slurry (a weight ratio of LTO-A:PVdF is 98:2).

The slurry is coated on an aluminum foil to the thickness of 90 μm and dried in a vacuum at 120° C. to manufacture a negative electrode.

Subsequently, the negative electrode is wound into a round shape with the diameter of 12 mm, and a 2032 type coin half cell is manufactured using a lithium metal (foil) as a counter electrode. In this instance, an electrolyte solution used is a solution of 1.3M $LiPF_6$ in a mixed solvent of ethylene carbonate, diethylene carbonate and ethylmethyl carbonate at a volume ratio of 3:5:2.

Example 2

Except that primary particles having the average particle size D50 of 600 nm are obtained by performing wet milling at 1,000 rpm for 80 minutes when preparing a precursor composition, a lithium titanium-based composite is prepared by the same method as example 1.

Except that the prepared lithium titanium-based composite is used, a negative electrode and a secondary battery comprising the same are manufactured by the same method as example 1.

Example 3

Except that primary particles having the average particle size D50 of 1,000 nm are obtained by performing wet milling at 500 rpm for 30 minutes when preparing a precursor composition, a lithium titanium-based composite is prepared by the same method as example 1.

Except that the prepared lithium titanium-based composite is used, a negative electrode and a secondary battery comprising the same are manufactured by the same method as example 1.

Comparative Example 1

Except that primary particles having the average particle size D50 of 500 nm are obtained by performing wet milling at 1,500 rpm for 120 minutes when preparing a precursor composition, a lithium titanium-based composite is prepared by the same method as example 1.

Except that the prepared lithium titanium-based composite is used, a negative electrode and a secondary battery comprising the same are manufactured by the same method as example 1.

Comparative Example 2

Except that primary particles having the average particle size D50 of 200 nm are obtained by performing wet milling at 1,500 rpm for 180 minutes when preparing a precursor composition, a lithium titanium-based composite is prepared by the same method as example 1.

Except that the prepared lithium titanium-based composite is used, a negative electrode and a secondary battery comprising the same are manufactured by the same method as example 1.

Comparative Example 3

Except that primary particles having the average particle size D50 of 1.2 μm are obtained by performing wet milling at 600 rpm for 30 minutes using $TiO_2$ raw material having the size of 1.5 μm when preparing a precursor composition, a lithium titanium-based composite is prepared by the same method as example 1.

Except that the prepared lithium titanium-based composite is used, a negative electrode and a secondary battery comprising the same are manufactured by the same method as example 1.

Measurement of Characteristics

Average Particle Size D50 of Primary Particles of Lithium Titanium-Based Composite The average particle size D50 of the primary particles of the lithium titanium-based composite is defined as a particle size corresponding to 50% of the total volume accumulated from small particles. To determine, the average particle size D50, the primary particles of the lithium titanium-based composite prepared in examples 1 to 3 and comparative examples 1 to 3 are dispersed in a dispersion medium and introduced into a laser diffraction particle size measurement instrument (Microtrac MT 3000), and after illuminated with an ultrasound of about 28 kHz at the output of 60 W, the average particle size D50 at 50% of the particle size distribution in the measurement instrument is calculated.

Charge Transfer Resistance (Rct)

For each of the secondary batteries manufactured in examples 1 to 3 and comparative examples 1 to 3, after 3rd cycles under charge CC/CV, 0.2 C, 5 mV, 0.005 C cut, discharge CC, 0.2 C, 1.0V at 25° C., it is charged at 0.2 C to SOC 50%. The charge transfer resistance of the coin half cell charged to SOC 50% is measured using electrochemical impedance spectroscopy (EIS). In this instance, the charge transfer resistance is measured under the condition of Frequency set to the range between $10^6$ Hz and 0.05 Hz. Z'(Ohm) measured by EIS was calculated using a fitting program and the values are shown in the following Table 1.

Charge Resistance at Room Temperature

For each of the secondary batteries manufactured in examples 1 to 3 and comparative examples 1 to 3, the internal resistance at room temperature is measured. After adjusting the temperature of each secondary battery to 25° C. by storing each secondary battery in a chamber of 25° C. for 3 hours, resistance is measured at each SOC through the hybrid pulse power characterization (HPPC) test. In this instance, after each secondary battery is charged at 10 C for 10 sec from SOC 5% to SOC 95%, at rest for 1 hour and then discharged at 10 C for 10 sec from SOC 5% to SOC 95%, the charge/discharge resistance of the lithium secondary battery is measured at the interval of 5% from SOC 5% to SOC 95%. The measured resistance at SOC 50% with charge at room temperature (25° C.) is shown in the following Table 1.

Charge Resistance at Low Temperature

For each of the secondary batteries manufactured in examples 1 to 3 and comparative examples 1 to 3, the internal resistance at low temperature is measured. After adjusting the temperature of each secondary battery to −20° C. by storing each secondary battery in a chamber of −20° C. for 3 hours, the resistance is measured at each SOC through the HPPC test. In this instance, after each secondary battery is charged at 5 C for 10 sec from SOC 5% to SOC 95%, at rest for 1 hour and then discharged at 5 C for 10 sec from SOC 5% to SOC 95%, the charge/discharge resistance of the lithium secondary battery is measured at the interval of 5% from SOC 5% to SOC 95%. The measured resistance at SOC 50% with charge at low temperature (−20° C.) is shown in the following Table 1 and the FIGURE.

TABLE 1

| | | Resistance at SOC 50% (mΩ) | |
|---|---|---|---|
| | Charge transfer resistance (Rct) (Ω) | Charge resistance at room temperature (25° C., 10 C.) | Charge resistance at low temperature (−20° C., 5 C.) |
| Example 1 | 0.20 | 0.69 | 5.57 |
| Example 2 | 0.21 | 0.68 | 5.59 |
| Example 3 | 0.22 | 0.71 | 5.42 |
| Comparative example 1 | 0.27 | 0.67 | 5.82 |
| Comparative example 2 | 0.26 | 0.67 | 6.64 |
| Comparative example 3 | 0.27 | 0.80 | N/A |

Referring to Table 1 and the FIGURE, it is found that the secondary batteries of examples 1 to 3 adopting the lithium titanium-based composite having the average particle size of 550 nm to 1.1 μm as the negative electrode active material have a smaller charge transfer resistance, and show a similar level of charge resistance at room temperature but a very low charge resistance at low temperature, compared to the secondary batteries of comparative examples 1 to 3 adopting the lithium titanium-based composite of a smaller or larger average particle size as the negative electrode active material. The secondary battery of comparative example 3 shows a very high internal resistance at room temperature, and its charge resistance at low temperature cannot be measured.

From the foregoing, it is expected that the secondary batteries of examples 1 to 3 will have the improved output characteristics at low temperature by adjusting the average particle size of the primary particles of the lithium titanium-based composite used as the negative electrode active material to the range between 550 nm and 1.1 μm.

What is claimed is:
1. A negative electrode active material for a secondary battery, comprising:
   lithium titanium-based composite particles comprising:
      a lithium titanium oxide represented by $Li_xTi_yO_z$ wherein x, y and z satisfy 0.1≤x≤4, 1≤y≤5 and 2≤z≤12;
      Zr doped into the lithium titanium oxide; and
      an aluminum and sulfur containing compound coated on a surface of the lithium titanium oxide,
   wherein the lithium titanium-based composite particles comprise at least one of primary particles or secondary particles formed by agglomeration of the primary particles,
   an average particle size (D50) of the primary particles of the lithium titanium-based composite particles is in a range of 550 nm to 1.1 μm, and
   the aluminum and sulfur containing compound comprises $Al_2(SO_4)_3$.
2. The negative electrode active material for the secondary battery according to claim 1, wherein an amount of the doped Zr in the lithium titanium oxide is 500 ppm to 2,000 ppm based on a weight of the lithium titanium oxide.

3. The negative electrode active material for the secondary battery according to claim 1, wherein the aluminum and sulfur containing compound is present in an amount of 0.4 mM to 0.9 mM based on 1M lithium titanium oxide.

4. The negative electrode active material for the secondary battery according to claim 1, wherein the lithium titanium oxide is further doped with at least one of aluminum or sulfur.

5. The negative electrode active material for the secondary battery according to claim 1, wherein the average particle size (D50) of the primary particles of the lithium titanium-based composite particles is 600 nm to 1.0 μm.

6. A method for manufacturing a negative electrode active material for a secondary battery, comprising:
 (a) mixing a lithium precursor, a titanium precursor and a zirconium precursor to prepare a precursor mixture;
 (b) thermally treating the precursor mixture at a temperature ranging from 700° C. to 1,100° C. to obtain a lithium titanium oxide; and
 (c) mixing the lithium titanium oxide obtained after the thermal treatment with an aluminum and sulfur containing compound and thermally treating the mixture at a temperature ranging from 400° C. to 500° C. to obtain lithium titanium-based composite particles,
 wherein the lithium titanium-based composite particles comprise at least one of primary particles or secondary particles formed by agglomeration of the primary particles, and
 an average particle size (D50) of the primary particles of the lithium titanium-based composite particles is 550 nm to 1.1 μm, and the aluminum and sulfur containing compound comprises $Al_2(SO_4)_3$.

7. The method for manufacturing the negative electrode active material for the secondary battery according to claim 6, wherein the lithium precursor comprises at least one of $Li_2CO_3$, LiOH, LiF, $Li_2SO_4$, $LiNO_3$, or LiCl.

8. The method for manufacturing the negative electrode active material for the secondary battery according to claim 6, wherein the titanium precursor comprises at least one of $TiO_2$, $TiCl_4$, $TiOCl_2$, $TiOSO_4$, or $TiO(OH)_2$.

9. The method for manufacturing the negative electrode active material for the secondary battery according to claim 6, wherein the zirconium precursor comprises at least one of $Zr(OH)_4$ or $ZrO_2$.

10. The method for manufacturing the negative electrode active material for the secondary battery according to claim 6, wherein preparing the precursor mixture comprises mixing the titanium precursor and the zirconium precursor with water, performing wet milling at 500 rpm to 2,000 rpm for 30 minutes to 3 hours, and adding the lithium precursor.

11. The method for manufacturing the negative electrode active material for the secondary battery according to claim 6, wherein a temperature of the thermal treatment performed after mixing the lithium titanium oxide with the aluminum and sulfur containing compound is 400° C. to 480° C., and the aluminum and sulfur containing compound is present in an amount of 0.5 mM to 0.8 mM based on 1M lithium titanium oxide.

12. The method for manufacturing the negative electrode active material for the secondary battery according to claim 11, wherein the thermal treatment temperature is 450° C., and the aluminum and sulfur containing compound is present in an amount of 0.7 mM based on 1M lithium titanium oxide.

13. A lithium secondary battery, comprising:
 a positive electrode comprising a positive electrode active material;
 a negative electrode comprising a negative electrode active material;
 a separator interposed between the positive electrode and the negative electrode; and
 an electrolyte solution,
 wherein the negative electrode active material is the negative electrode active material for the secondary battery defined in claim 1.

* * * * *